(12) United States Patent
Hart et al.

(10) Patent No.: US 8,075,441 B2
(45) Date of Patent: Dec. 13, 2011

(54) AUTOMATIC TRANSMISSION GEAR AND CLUTCH ARRANGEMENT

(75) Inventors: James M. Hart, Belleville, MI (US); Scott H. Wittkopp, Ypsilanti, MI (US); Clinton E. Carey, Highland, MI (US); Andrew W. Phillips, Rochester, MI (US); James B. Borgerson, Clarkston, MI (US); Steven P. Moorman, Dexter, MI (US); Elizabeth I. Wooden, Farmington Hills, MI (US); Edwin T. Grochowski, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 12/361,261

(22) Filed: Jan. 28, 2009

(65) Prior Publication Data

US 2009/0247343 A1    Oct. 1, 2009

Related U.S. Application Data

(60) Provisional application No. 61/040,939, filed on Mar. 31, 2008.

(51) Int. Cl.
 *F16H 3/44* (2006.01)
 *F16H 57/04* (2006.01)
 *F16H 31/00* (2006.01)

(52) U.S. Cl. .................. 475/282; 475/159; 475/116

(58) Field of Classification Search .................. 74/467, 74/468; 475/31, 72, 116, 145, 146, 257, 475/269, 275, 276, 277, 282, 288, 296, 317, 475/330

See application file for complete search history.

(56) References Cited

U.S. PATENT DOCUMENTS

| | | | |
|---|---|---|---|
| 7,670,246 B2 * | 3/2010 | Kamm et al. | 475/275 |
| 7,699,741 B2 * | 4/2010 | Hart et al. | 475/271 |
| 7,704,180 B2 * | 4/2010 | Wittkopp et al. | 475/275 |
| 7,736,260 B2 * | 6/2010 | Hart et al. | 475/276 |
| 7,736,264 B2 * | 6/2010 | Moorman et al. | 475/277 |
| 7,775,931 B2 * | 8/2010 | Carey et al. | 475/276 |
| 7,785,225 B2 * | 8/2010 | Phillips et al. | 475/277 |
| 7,841,960 B2 * | 11/2010 | Baldwin | 475/280 |
| 2008/0227587 A1 * | 9/2008 | Carey et al. | 475/283 |
| 2008/0261763 A1 * | 10/2008 | Phillips et al. | 475/276 |
| 2008/0300093 A1 * | 12/2008 | Borgerson | 475/276 |
| 2009/0209388 A1 * | 8/2009 | Carey et al. | 475/276 |
| 2009/0209390 A1 * | 8/2009 | Carey et al. | 475/282 |
| 2009/0209391 A1 * | 8/2009 | Carey et al. | 475/282 |
| 2009/0215581 A1 * | 8/2009 | Carey et al. | 475/276 |
| 2009/0215582 A1 * | 8/2009 | Carey et al. | 475/277 |
| 2009/0264239 A1 * | 10/2009 | Carey et al. | 475/205 |
| 2009/0264240 A1 * | 10/2009 | Carey et al. | 475/205 |
| 2009/0264242 A1 * | 10/2009 | Carey et al. | 475/210 |
| 2009/0264245 A1 * | 10/2009 | Carey et al. | 475/275 |
| 2009/0264246 A1 * | 10/2009 | Carey et al. | 475/275 |
| 2010/0144486 A1 * | 6/2010 | Hart et al. | 475/275 |
| 2010/0279811 A1 * | 11/2010 | Portell et al. | 475/116 |
| 2011/0053725 A1 * | 3/2011 | Hart et al. | 475/116 |

* cited by examiner

*Primary Examiner* — David D Le
*Assistant Examiner* — Michael Gonzalez (57) ABSTRACT

A transmission is provided having an input member, an output member, four planetary gear sets, a plurality of coupling members and a plurality of torque-transmitting devices. Further, a hydraulic fluid control circuit is provided for controlling the operation of the plurality of torque-transmitting devices. The hydraulic fluid control circuit receives pressurized hydraulic fluid from an off-axis hydraulic fluid pump and has a plurality of fluid passages disposed in the transmission house, input shaft, output shaft and other coupling members.

20 Claims, 5 Drawing Sheets

AUTOMATIC TRANSMISSION GEAR AND CLUTCH ARRANGEMENT

CROSS-REFERENCE TO RELATED APPLICATIONS

This application claims the benefit of U.S. Provisional Application No. 61/040,939, filed on Mar. 31, 2008. The disclosure of the above application is incorporated herein by reference.

FIELD

The present invention relates generally to multiple speed transmissions having a plurality of planetary gear sets and a plurality of torque transmitting devices and more particularly to a hydraulic control circuit for controlling the operation of the plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes a transmission housing with a front support, with the front support having a first apply fluid passage and a second apply fluid passage. The transmission further includes a first, a second, a third, and a fourth planetary gear sets each having a first, a second, and a third members. The transmission further includes five torque-transmitting mechanisms, with a first and a second of the five torque-transmitting mechanisms each comprising a first apply chamber and a piston wherein the first apply fluid passage is in communication with the first apply chamber of the first of the five torque-transmitting mechanisms and the second apply fluid passage is in communication with the first apply chamber of the second of the five torque-transmitting mechanisms. A third, a fourth, and a fifth of the five torque-transmitting mechanisms each comprise an apply chamber, a dam chamber, and a piston. The five torque-transmitting mechanisms selectively interconnect at least one of the first, second, and third members with at least one other of the first members, second members, third members, and the transmission housing. The transmission further includes an input member continuously interconnected with the second member of the second planetary gear set. The input member includes a first, a second, a third, and a fourth bores disposed parallel to a longitudinal axis of the input member. The input member further includes a first clutch port in communication with the apply chamber of the third of the five torque-transmitting mechanisms and the first bore of the input member. The input member further includes a second clutch port in communication with the apply chamber of the fourth of the five torque-transmitting mechanisms and the fourth bore of the input member. The input member further includes a third clutch port in communication with the apply chamber of the fifth of the five torque-transmitting mechanisms and the second bore of the input member. The input member further includes a first, a second, and a third lubrication ports in communication with the first bore of the input member. The input member further includes a first, a second, and a third dam ports in communication with the dam chambers of the third, fourth, and fifth of the five torque-transmitting mechanisms and the third bore of the input member. The transmission further includes an output member continuously interconnected to at least one of the second member of the fourth planetary gear set and the second member of the third planetary gear set and having a lubrication bore in communication with the first bore of the input member. The transmission further includes a first interconnecting member continuously interconnecting the first member of the first planetary gear set with the first member of the second planetary gear set, a second interconnecting member continuously interconnecting the second member of the first planetary gear set with the third member of the fourth planetary gear set, a third interconnecting member continuously interconnecting the third member of the second planetary gear set with the first member of the third planetary gear set, and a fourth interconnecting member continuously interconnecting the second member of the third planetary gear set with the second member of the fourth planetary gear set.

In one aspect of the present invention the first of the five torque transmitting mechanisms is selectively engageable to interconnect at least one of the first member of the first planetary gear set and the first member of the second planetary gear set with the stationary element. The second of the five torque transmitting mechanisms is selectively engageable to interconnect the third member of the first planetary gear set with the stationary element. The third of the five torque transmitting mechanisms is selectively engageable to interconnect at least one of the second member of the second planetary gear set and the input member with the first member of the fourth planetary gear set. The fourth of the five torque transmitting mechanisms is selectively engageable to interconnect at least one of the third member of the second planetary gear set and the first member of the third planetary gear set with the first member of the fourth planetary gear set. The fifth of the five torque transmitting mechanisms is selectively engageable to interconnect the third member of the third planetary gear set with the first member of the fourth planetary gear set. The five torque-transmitting mechanisms include a first and a second brake and a first, a second, and a third clutch. The five torque-transmitting mechanisms are selectively engageable in combinations of at least three to establish at least eight forward speed ratios and at least one reverse speed ratio between the input member and the output member.

In another aspect of the present invention, the front support further includes a third apply fluid passage in communication with a second apply chamber of the first of the five torque transmitting mechanisms, a fourth apply fluid passage in communication with a second apply chamber of the second of the five torque transmitting mechanisms, a first dam passage in communication with a dam chamber of the first of the five torque transmitting mechanisms, and a second dam passage in communication with a dam chamber of the second of the five torque transmitting mechanisms.

In yet another aspect of the present invention, the transmission further includes a sleeve shaft, supported by the front support of the transmission housing, and a plurality of input member seals. The transmission further includes a first annular channel, a second annular channel, a third annular channel, and a fourth annular channel. The annular channels are defined by the inner surface of the sleeve shaft, the outer surface of the input member, and the plurality of input member seals. The first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port.

In yet another aspect of the present invention, the transmission further includes a hydraulic fluid pump fixed to the transmission housing and drivingly connected to at least one of an engine and a torque converter pump. The hydraulic fluid pump provides a pressurized hydraulic fluid to the hydraulic control system.

In yet another aspect of the present invention, the transmission further includes a first speed sensor assembly, a second speed sensor assembly, and a third speed sensor assembly each having a speed sensor fixed to the transmission housing and a speed sensor ring rotatably fixed to at least one of the interconnecting members, the input member, and the output member.

In yet another aspect of the present invention, the first speed sensor assembly has a first speed sensor ring rotatably fixed to at least one of the second member of the second planetary gear set and the input member and the third speed sensor assembly has a third speed sensor ring rotatably fixed to the output member.

In yet another aspect of the present invention, the second speed sensor has a second speed sensor ring rotatably fixed to at least one of the first member of the first planetary gear set, the second interconnecting member, and the third interconnecting member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
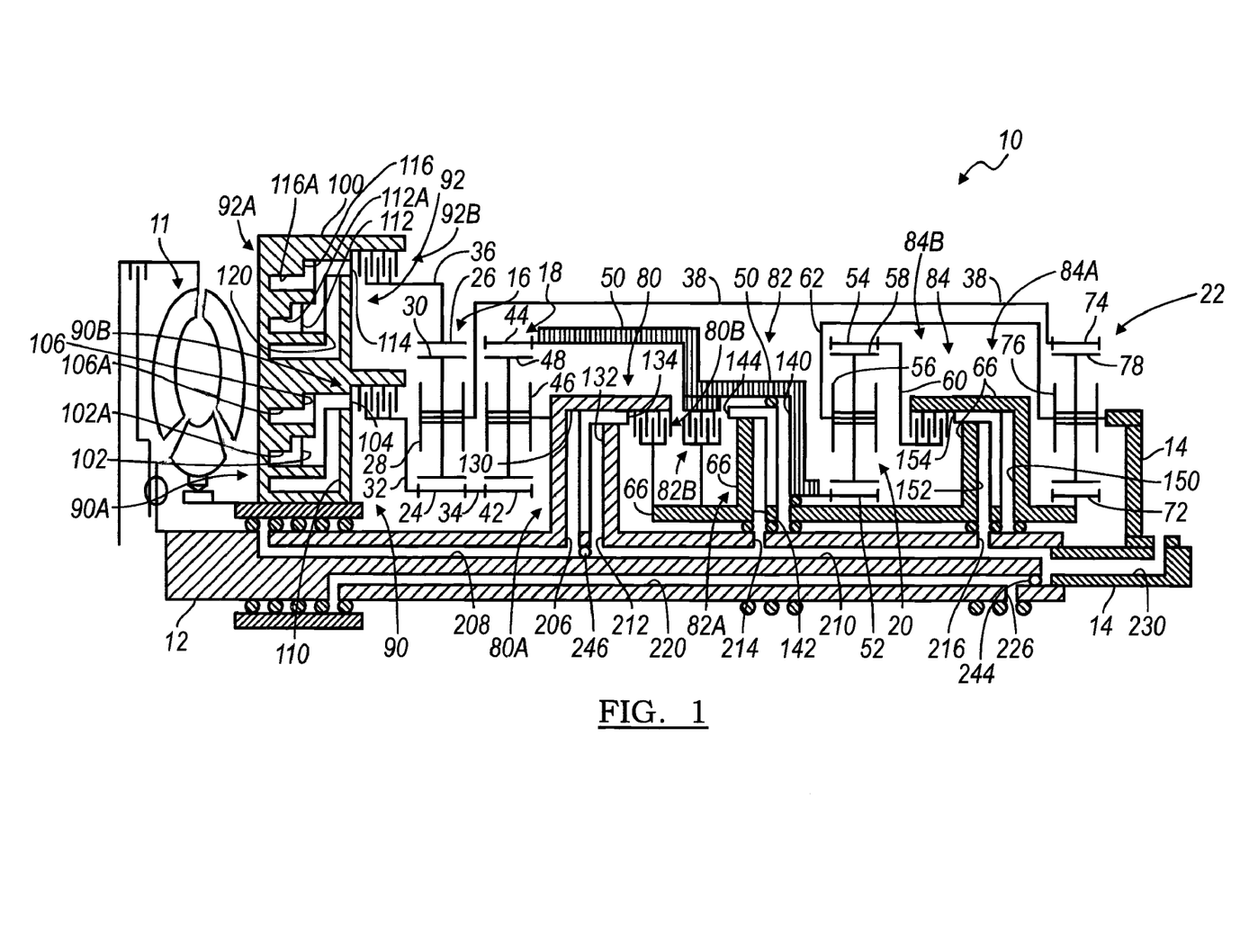
FIG. 1 is a schematic view of an embodiment of an eight speed transmission according to the present invention.

Referring to the drawings, wherein like reference numbers refer to like components, in FIG. 1 a multi-speed transmission 10 is illustrated. The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or torque converter 11. The output shaft 14 is continuously connected with the final drive unit or transfer case (not shown).

In a preferred embodiment of the present invention, the transmission 10 includes four planetary gear sets 16, 18, 20 and 22. The planetary gear sets 16, 18, 20 and 22 are connected between the input shaft 12 and the output shaft 14.

The first planetary gear set 16 includes a sun gear member 24, a ring gear member 26 and a carrier member 28 that rotatably supports a set of planet gears 30. Sun gear member 24 is connected for common rotation with a first shaft or interconnecting member 32 and a second shaft or interconnecting member 34. Ring gear member 26 is connected for common rotation with a third shaft or interconnecting member 36. Carrier member 28 is connected for common rotation with a fourth shaft or interconnecting member 38. Planet gears 30 are each configured to intermesh with both the sun gear member 24 and the ring gear member 26.

The second planetary gear set 18 includes a sun gear member 42, a ring gear member 44 and a carrier member 46 that rotatably supports a set of planet gears 48. Sun gear member 42 is connected for common rotation with the second shaft or interconnecting member 34. Ring gear member 44 is connected for common rotation with a fifth shaft or interconnecting member 50. Carrier member 46 is connected for common rotation with the input shaft 12. Planet gears 48 are each configured to intermesh with both the sun gear member 42 and the ring gear member 44.

The third planetary gear set 20 includes a sun gear member 52, a ring gear member 54 and a carrier member 56 that rotatably supports a set of planet gears 58. Sun gear member 52 is connected for common rotation with the fifth shaft or interconnecting member 50. Ring gear member 54 is connected for common rotation with a sixth shaft or interconnecting member 60. Carrier member 56 is connected for common rotation with a seventh shaft or interconnecting member 62. Planet gears 58 are each configured to intermesh with both the sun gear member 52 and the ring gear member 54.

The fourth planetary gear set 22 includes a sun gear member 72, a ring gear member 74 and a carrier member 76 that rotatably supports a set of planet gears 78. Sun gear member 72 is connected for common rotation with eighth shaft or interconnecting member 66. Ring gear member 74 is connected for common rotation with the fourth shaft or interconnecting member 38. Carrier member 76 is connected for common rotation with the output shaft 14 and the seventh shaft or interconnecting member 62. Planet gears 78 are each configured to intermesh with both the sun gear member 72 and the ring gear member 74.

The transmission 10 includes a variety of torque-transmitting mechanisms or devices allowing for selective coupling of shafts or interconnecting members, members of the planetary gear sets and the transmission housing 100. More specifically, transmission 10 includes a first clutch 80, a second clutch 82, a third clutch 84, a first brake 90 and a second brake 92. For example, first clutch 80 is selectively engageable to connect the eighth shaft or interconnecting member 66 to the carrier member 46 of the second planetary gear set 18 and to the input shaft 12. Second clutch 82 is selectively engagable to connect the eighth shaft or interconnecting member 66 to the fifth shaft or interconnecting member 50. Third clutch 84 is selectively engagable to connect the sixth shaft or interconnecting member 60 to the eighth shaft or interconnecting member 66. First brake 90 is selectively engagable to connect the first shaft or interconnecting member 32 to a transmission housing 100 to restrict rotation of the first shaft or interconnecting member 32 relative to the transmission housing 100. Second brake 92 is selectively engagable to connect the third shaft or interconnecting member 36 to the transmission housing 100 to restrict rotation of the third shaft or member 36 relative to the transmission housing 100.

The transmission 10 is capable of transmitting torque from the input shaft 12 to the output shaft 14 in at least eight forward torque ratios and one reverse torque ratio. Each of the forward torque ratios and the reverse torque ratios are attained by engagement of one or more of the torque-transmitting mechanisms (i.e. first clutch 80, a second clutch 82, a third clutch 84, a first brake 90 and a second brake 92). Those skilled in the art will readily understand that a different speed ratio is associated with each torque ratio. Thus, at least eight forward speed ratios and at least one reverse speed ratio may be attained by the transmission 10.

With continuing reference to FIG. 1, the location of the brakes 90, 92 and clutches 80, 82, 84 along the input shaft 12 and relative to the planetary gear sets 16, 18, 20, 22 will now be described. The first and second brakes 90, 92 are arranged coaxially with the input shaft 12 with the second brake 92 disposed radially outward of the first brake 90. The first brake 90 includes an actuating assembly 90A formed in the transmission housing 100 and a clutch pack 90B. The actuating assembly 90A of the first brake 90 includes a brake piston 104 and a first apply chamber 102. Further, as shown in FIG. 1, the actuating assembly 90A of the first brake 90 also includes a second apply chamber 106 and a dam chamber 110. The second brake 92 includes an actuating assembly 92A formed in the transmission housing 100 and a clutch pack 92B. The actuating assembly 92A of the second brake 92 includes a brake piston 114 and a third apply chamber 112. Further, as shown in FIG. 1, the actuating assembly 92A of the second brake 92 also include a fourth apply chamber 116 and a dam chamber 120. However, the present invention also contemplates the use of brakes having a single apply chamber without the use of a dam chamber. The transmission housing further includes a first, second, third, and fourth apply fluid passages 102A, 106A, 112A, 116A. The first and second apply fluid passages 102A, 106A are in communication with the first and second apply chambers 102, 106, respectively, of the first brake 90 actuating assembly 90A. The third and fourth apply fluid passages 112A, 116A are in communication with the third and fourth apply chambers 112, 116, respectively, of the second brake 92 actuating assembly 92A.

The first, second, and third clutches 80, 82, 84 are arranged coaxially with the input shaft 12. The first clutch 80 and second clutch 82 are disposed between the second and third planetary gear sets 18, 20. More specifically, the first clutch 80 is adjacent the second planetary gear set 18 and the second clutch 82 is adjacent the third planetary gear set 20. The third clutch 84 is disposed between the third and fourth planetary gear sets 20, 22.

The first clutch 80 includes an actuating assembly 80A and a clutch pack 80B. The actuating assembly 80A of the first clutch 80 includes an apply chamber 130, a dam chamber 132 and a piston 134. The actuating assembly 80A is supported by and attached to the input shaft 12. The clutch pack 80B includes a plurality of alternating friction disks or rings. The piston 134 of the actuating assembly 80A engages the clutch pack 80B to force the plurality of alternating friction disks together to interconnect the planet carrier 46 and input shaft 12 with the eighth shaft or interconnecting member 66.

The second clutch 82 includes an actuating assembly 82A and a clutch pack 82B. The actuating assembly 82A of the second clutch 82 includes an apply chamber 140, a dam chamber 142 and a piston 144. The actuating assembly 82A is supported rigidly by the eighth shaft or interconnecting member 66. The clutch pack 82B includes a plurality of alternating friction disks or rings. The piston 144 of the actuating assembly 82A engages the clutch pack 82B to interconnect the eighth interconnecting member or shaft 66 and the fifth shaft or interconnecting member 50.

The third clutch 84 includes an actuating assembly 84A and a clutch pack 84B. The actuating assembly 84A of the third clutch 84 includes an apply chamber 150, a dam chamber 152 and a piston 154. The actuating assembly 84A is supported rigidly by the eighth shaft or interconnecting member 66. The clutch pack 84B includes a plurality of alternating friction disks or rings. The piston 154 of the actuating assembly 84A engages the clutch pack 84B to interconnect the eighth interconnecting member or shaft 66 and the sixth shaft or interconnecting member 60.

Figure 2A:
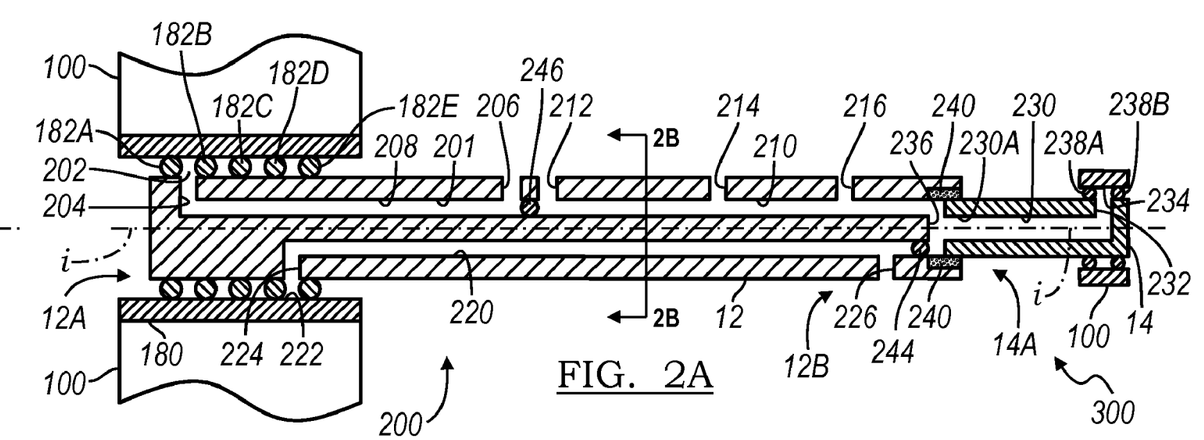
FIG. 2A is a cross section of an input shaft and an output shaft illustrating a hydraulic control circuit for an eight speed transmission in accordance with an embodiment of the present invention.
Figure 2B:
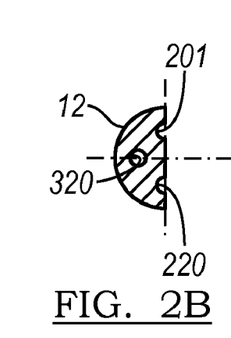
FIG. 2B is a cross section of the input shaft taken along the line 2B-2B in FIG. 2A.
Figure 3A:
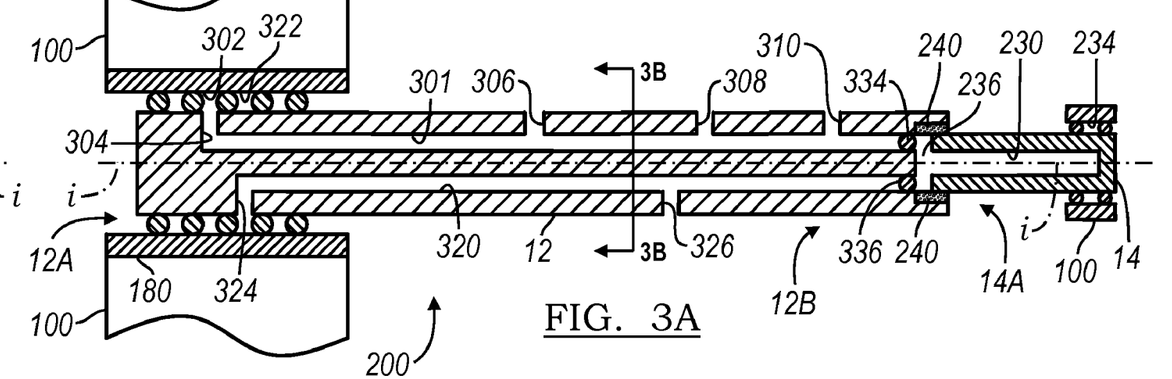
FIG. 3A is a cross section of the input shaft and the output shaft illustrating a hydraulic control circuit for an eight speed transmission in accordance with an embodiment of the present invention where the cross section is axially rotated 90° from the cross section taken in FIG. 2A.
Figure 3B:
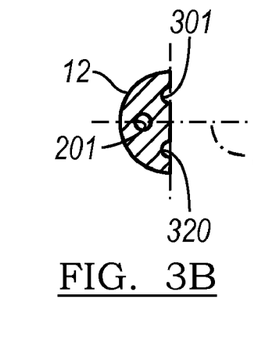
FIG. 3B is a cross section of the input shaft taken along the line 3B-3B in FIG. 3A.

Referring now to FIGS. 2A, 2B, 3A and 3B, cross-sectional views of the input and output shafts 12, 14 are illustrated depicting a hydraulic control circuit 200, in accordance with an embodiment of the present invention. Hydraulic control circuit 200 is a hydraulic circuit that contains hydraulic fluid that is pressurized by a hydraulic fluid pump (not shown) and generates hydraulic control signals to actuate the first, second and third clutches 80, 82 and 84. The hydraulic control circuit 200 is formed in-part by four bores: a first bore 201, a second bore 220, a third bore 301 and a fourth bore 320 each disposed in the input shaft 12 and by four annular channels: a first annular channel 202, a second annular channel 222, a third annular channel 302 and a fourth annular channel 322. The first, second, third and fourth bore 201, 220, 301, 320 are disposed longitudinally in the input shaft 12 and arranged 90° apart from each other as shown in FIGS. 2B and 3B. The first annular channel 202 is defined by the outer surface of the input shaft 12, the inner surface of a sleeve shaft 180 and the side surfaces of a first input shaft seal 182A and a second input shaft seal 182B. The second annular channel 222 is defined by the outer surface of the input shaft 12, the inner surface of a sleeve shaft 180 and the side surfaces of a fourth input shaft seal 182D and a fifth input shaft seal 182E. The third annular channel 302 is defined by the outer surface of the input shaft 12, the inner surface of a sleeve shaft 180 and the side surfaces of the second input shaft seal 182B and a third input shaft seal 182C. The fourth annular channel 322 is defined by the outer surface of the input shaft 12, the inner surface of a sleeve shaft 180 and the side surfaces of the third input shaft seal 182C and the fourth input shaft seal 182D.

The sleeve shaft 180 is fixedly attached to the transmission housing 100. The input shaft seals 182A, 182B, 182C, 182D, 182E are disposed coaxially with the input shaft 12 between the sleeve shaft 180 and the input shaft 12. The input shaft seals 182A, 182B, 182C, 182D, 182E rotatably contact a first end 12A of the input shaft 12. The first annular channel 202 communicates with the first bore 201 through a first port 204 formed in the first end 12A of the input shaft 12. The second annular channel 222 communicates with the second bore 220 through a second port 224 formed in the first end 12A of the input shaft 12. The third annular channel 302 communicates with the third bore 301 through a third port 304 formed in the first end 12A of the input shaft 12. The fourth annular channel 322 communicates with the fourth bore 320 through a fourth port 324 formed in the first end 12A of the input shaft 12.

The first bore 201 is divided into a first bore portion 208 and a second bore portion 210 by a first plug 246 fixedly disposed in first bore 201. The first bore portion 208 of the first bore 201 communicates with the first clutch apply chamber 130 (see FIG. 1) through the first clutch port 206.

The second bore 220 contains a second plug 244 fixedly disposed at the second end 12B of the input shaft 12 to seal the second bore 220. The second bore 220 communicates with the third clutch apply chamber 150 (see FIG. 1) through a third clutch port 226.

The third bore 301 has a third plug 334 fixedly disposed at the second end 12B of the input shaft 12 to seal the end of the third bore 301. A first, second and third dam ports 306, 308, 310 connect, respectively, the third bore 301 with clutch dam chambers 132, 142 and 152.

The fourth bore 320 has a fourth plug 336 fixedly disposed at a second end 12B of the input shaft 12 to seal the end of the fourth bore 320. The fourth bore 320 communicates with the second clutch apply chamber 140 through a second clutch port 326.

Referring again to FIG. 2A, a cross-sectional view of the input and output shafts 12, 14 is illustrated depicting a lubrication circuit 300 for supplying lubrication fluid to the clutches 80, 82 and 84. The lubrication circuit 300 is formed by the second portion 210 of the first bore 201, an output shaft bore 230, and an annular lubrication channel 234. The output shaft bore 230 is disposed in the output shaft 14 coaxially with the input shaft 12 and has an open end 230A and output shaft port 232. The annular lubrication channel 234 is defined by the outer surface of the output shaft 14, the inner surface of the transmission housing 100, and the side surfaces of a first output shaft seal 238A and a second output shaft seal 238B. The annular lubrication channel 234 communicates with the output shaft bore 230 through the output shaft port 232. The second end 12B of the input shaft 12 circumferentially overlaps and supports a first end 14A of the output shaft 14 through a support bushing 240. A lubrication cavity 236 is formed at the overlap or intersection of the input shaft 12 with the output shaft 14. The output shaft bore 230 communicates with the second portion 210 of the first bore 201 through the lubrication cavity 236. The second portion 210 of the first bore 201 provides lubrication oil to the clutches 80, 82, 84 and planetary gear sets 16, 18, 20, 22 through three lubrication ports 212, 214, 216 disposed in the input shaft 12.

Figure 4:
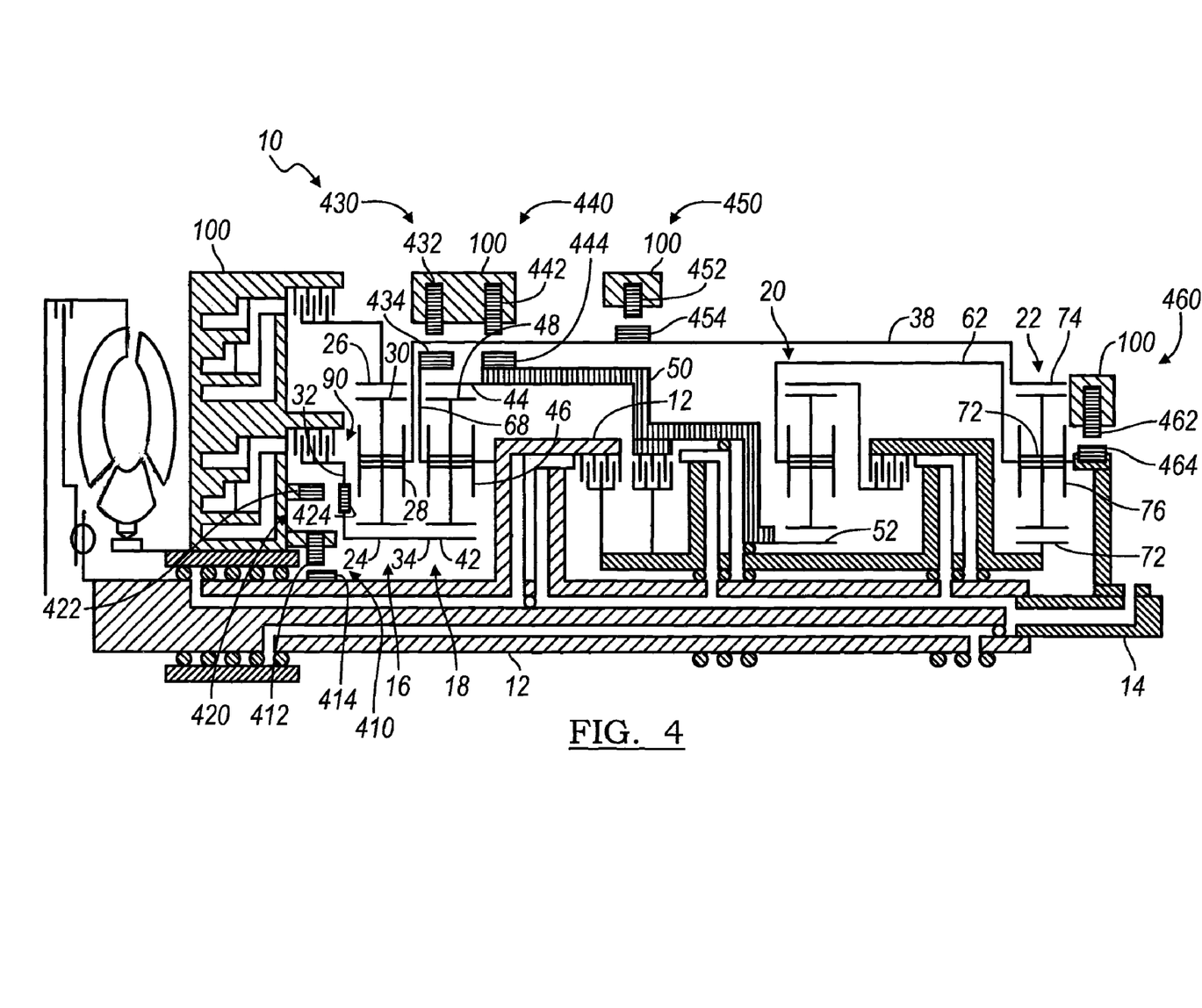
FIG. 4 is a diagram showing speed sensor locations for enabling an intermediate speed sensor.

Referring now to FIG. 4, a cross section of the transmission 10 is illustrated showing alternative locations for six speed sensor assemblies 410, 420, 430, 440, 450, 460. Each of six speed sensor assemblies 410, 420, 430, 440, 450, 460 include speed sensors 412, 422, 432, 442, 452, 462 and speed sensor rings 414, 424, 434, 444, 454, 464, respectively. The speed sensors 412, 422, 432, 442, 452, 462 are fixedly attached to the transmission housing 100. The speed sensors 412, 422, 432, 442, 452, 462 are conventional speed sensors such as Hall Effect sensors or variable reluctance sensors and the like. The speed sensor rings 414, 424, 434, 444, 454, 464 are in close proximity to the speed sensors 412, 422, 432, 442, 452, 462 and are fixedly attached to one of the rotatable shafts or members of transmission 10. Alternatively, the speed sensor rings 414, 424, 434, 444, 454, 464 are magnetic strips or toothed portions of shafts having magnetic material formed in the rotatable shafts or members of transmission 10.

For example, the first speed sensor 412 is fixedly attached to the transmission housing 100 and the first speed sensor ring 414 is fixedly connected to the input shaft 12. The second speed sensor 422 is fixedly disposed on the transmission housing 100 and the second speed ring 424 is fixedly disposed on the first shaft or member 32. The third speed sensor 432 fixedly disposed on the transmission housing 100 and the third speed sensor ring 434 is fixedly disposed on a ninth shaft or interconnecting member 68 connected for common rotation with the carrier member 46 of the second planetary gear set 18 and with the input shaft 12. The fourth speed sensor 442 is fixedly disposed on the transmission housing 100 and the fourth speed sensor ring 444 is fixedly disposed on the fifth shaft or interconnecting member 50. The third and fourth speed sensors 432, 442 are configured to sense the speed sensor rings 434, 444 through the fourth shaft or member 38. The fifth speed sensor 452 is fixedly disposed on the transmission housing 100 and the fifth speed sensor ring 454 is fixedly disposed on the fourth shaft or member 38. The sixth speed sensor 462 is fixedly disposed on the transmission housing 100 and the sixth speed sensor ring 464 is fixedly disposed on the output shaft 14.

Figure 5:
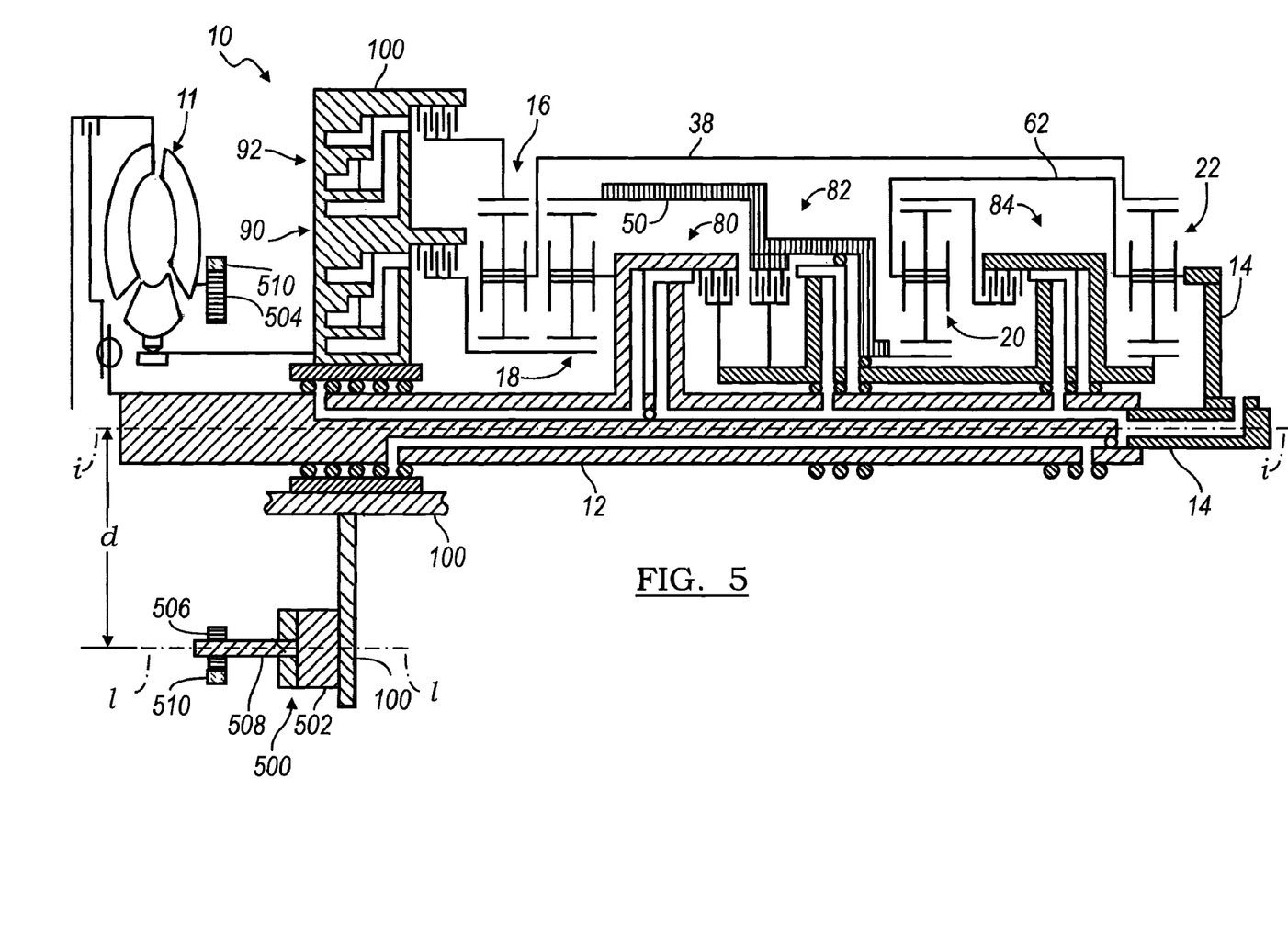
FIG. 5 is a schematic view of an embodiment of an eight speed transmission according to the present invention showing an off-axis input shaft driven fluid pump.

Referring now to FIG. 5, a cross section of the transmission 10 including an off-axis fluid pump assembly 500 is illustrated and will now be described. Off-axis fluid pump assembly 500 includes a transmission fluid pump 502, a drive gear or pulley member 504, a driven gear or pulley member 506, a pump shaft 508 and a chain or belt 510. The transmission fluid pump 502 is fixedly attached to the transmission housing 100 or a similar stationary member along an axis "l" that is offset a predefined radial distance "d" from the axis "i" of the input shaft 12. The drive gear or pulley member 504 is fixedly attached for common rotation with an output shaft of an engine (not shown) or a torque converter pump 11A. The driven gear or pulley member 506 is fixedly connected for common rotation with the pump shaft 508. The chain or belt 510 engages both the drive gear or pulley member 504 and the driven gear or pulley member 506 to transfer driving torque from the torque convertor pump 11A to the pump shaft 508. The pump shaft 508 transfers the driving torque produced in the chain or belt 510 to fluid pump 502. A stepped ratio may be used between the drive gear or pulley member 504 and the driven gear or pulley member 506 to reduce the amount of energy transferred to the transmission fluid pump 502 thus resulting in a more efficient transmission 10.

Figures 6A, 6B, 7A, 7B:
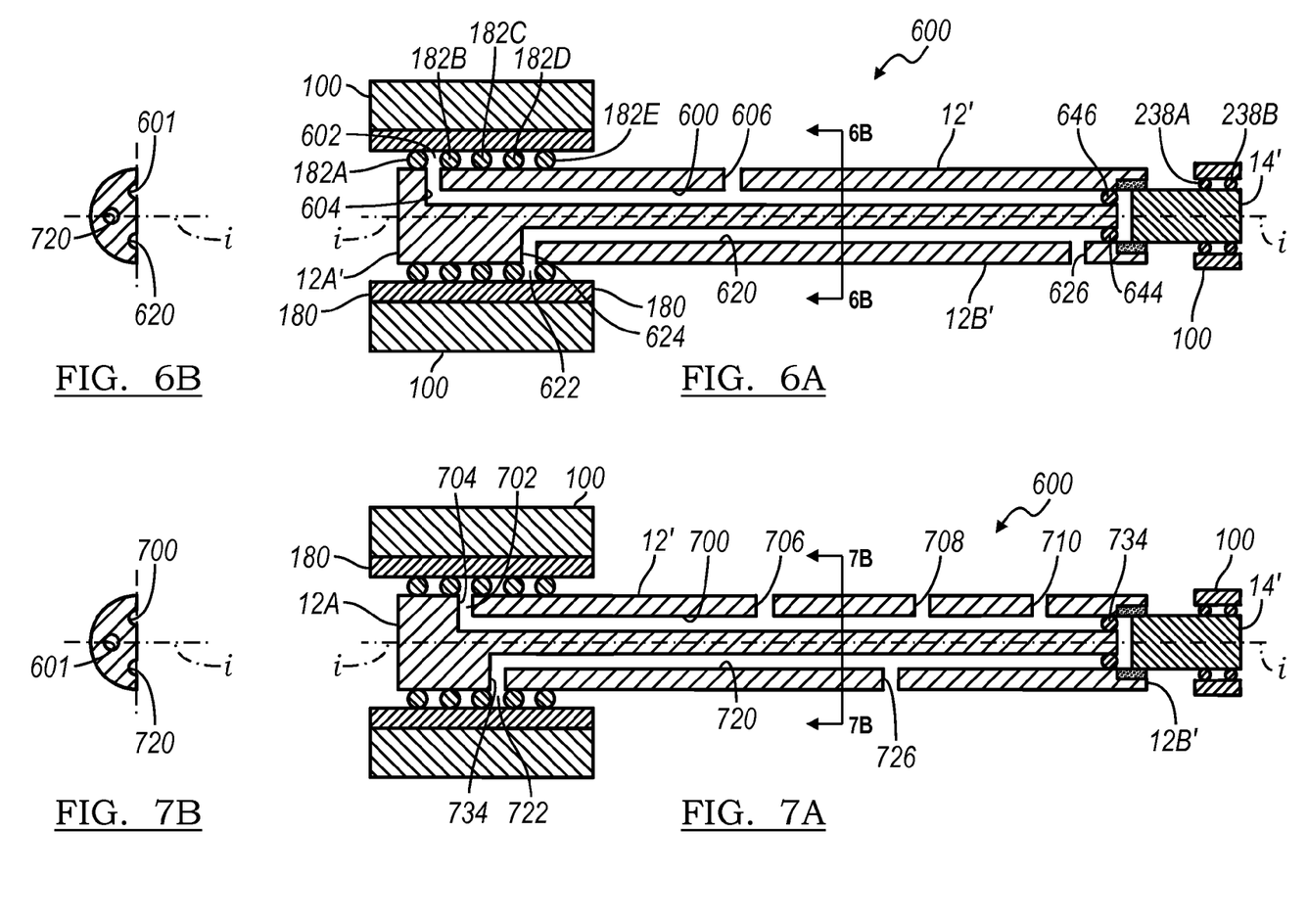
FIG. 6A is a cross section of the input shaft and the output shaft illustrating a hydraulic control circuit for an eight speed transmission in accordance with an embodiment of the present invention.
FIG. 6B is a cross section of the input shaft taken along the line 6B-6B in FIG. 6A.
FIG. 7A is a cross section of the input shaft and the output shaft illustrating a hydraulic control circuit for an eight speed transmission in accordance with an embodiment of the present invention where the cross section is axially rotated 90° from the cross section taken in FIG. 6A.
FIG. 7B is a cross section of the input shaft taken along the line 7B-7B in FIG. 7A.

Referring now to FIGS. 6A, 6B, 7A and 7B, cross-sectional views of input and output shafts 12', 14' are illustrated depicting a hydraulic control circuit 600, in accordance with another embodiment of the present invention. Hydraulic control circuit 600 is a hydraulic circuit that contains hydraulic fluid that is pressurized by a hydraulic fluid pump (not shown) and generates hydraulic control signals to actuate the first, second and third clutches 80, 82 and 84. The hydraulic control circuit 600 is formed in-part by four bores: a first bore 601, a second bore 620, a third bore 700 and a fourth bore 720 each disposed in the input shaft 12' and by four annular channels: a first annular channel 602, a second annular channel 622, a third annular channel 702 and a fourth annular channel 722. The first, second, third and fourth bore 601, 620, 700, 720 are disposed longitudinally in the input shaft 12' and arranged 90° apart from each other as shown in FIGS. 6B and 7B. The first annular channel 602 is defined by the outer surface of the input shaft 12', the inner surface of a sleeve shaft 180 and the side surfaces of a first input shaft seal 182A and a second input shaft seal 182B. The second annular channel 622 is defined by the outer surface of the input shaft 12', the inner surface of a sleeve shaft 180 and the side surfaces of a fourth input shaft seal 182D and a fifth input shaft seal 182E. The third annular channel 702 is defined by the outer surface of the input shaft 12' the inner surface of a sleeve shaft 180 and the side surfaces of the second input shaft seal 182B and a third input shaft seal 182C. The fourth annular channel 722 is defined by the outer surface of the input shaft 12', the inner surface of a sleeve shaft 180 and the side surfaces of the third input shaft seal 182C and the fourth input shaft seal 182D.

The sleeve shaft 180 is fixedly attached to the transmission housing 100. The input shaft seals 182A, 182B, 182C, 182D, 182E are disposed coaxially with the input shaft 12' between the sleeve shaft 180 and the input shaft 12' and rotatably supports a first end 12A' of the input shaft 12'. The first, second, third and fourth annular channels 602, 622, 702 and 722, communicate, respectively, with the first, second, third and fourth bores 601, 620, 700, 720 through first, second, third and fourth ports 604, 624, 704 and 724, formed in the first end 12A' of the input shaft 12'.

The first bore 601 contains a first plug 646 fixedly disposed at the second end 12B' of the input shaft 12' to seal the first bore 601. The first bore 601 communicates with the first clutch apply chamber 130 (see FIG. 1) through the first clutch port 606.

The second bore 620 contains a second plug 644 fixedly disposed at the second end 12B' of the input shaft 12' to seal the second bore 620. The second bore 620 communicates with the clutch apply chamber 150 (see FIG. 1) through a third clutch port 626.

The third bore 700 has a third plug 734 fixedly disposed at the second end 12B' of the input shaft 12' to seal the end of the third bore 700. First, second and third dam ports 706, 708, 710 connect, respectively, the third bore 700 with clutch dam chambers 132, 142 and 152.

The fourth bore 720 has a fourth plug 736 fixedly disposed at a second end 12B' of the input shaft 12' to seal the end of the second bore 720. The second bore 720 communicates with the second clutch apply chamber 140 through a second clutch port 726.

The description of the invention is merely exemplary in nature and variations that do not depart from the gist of the invention are intended to be within the scope of the invention. Such variations are not to be regarded as a departure from the spirit and scope of the invention.

What is claimed is:

1. A multi-speed transmission comprising:
    a transmission housing having a front support, the front support including a first apply fluid passage and a second apply fluid passage;
    a first, a second, a third, and a fourth planetary gear sets each having a first, a second, and a third members;
    five torque-transmitting mechanisms, a first and a second of the five torque-transmitting mechanisms each comprising a first apply chamber and a piston wherein the first apply fluid passage is in communication with the first apply chamber of the first of the five torque-transmitting mechanisms and the second apply fluid passage is in communication with the first apply chamber of the second of the five torque-transmitting mechanisms;
    a third, a fourth, and a fifth of the five torque-transmitting mechanisms each comprising an apply chamber, a dam chamber, and a piston;
    wherein the five torque-transmitting mechanisms selectively interconnect at least one of the first, second, and third members with at least one other of the first members, second members, third members, and the transmission housing;
    an input member continuously interconnected with the second member of the second planetary gear set, the input member having:
        a first, a second, a third, and a fourth bores disposed parallel to a longitudinal axis of the input member;
        a first clutch port in communication with the apply chamber of the third of the five torque-transmitting mechanisms and the first bore of the input member;
        a second clutch port in communication with the apply chamber of the fourth of the five torque-transmitting mechanisms and the fourth bore of the input member;
        a third clutch port in communication with the apply chamber of the fifth of the five torque-transmitting mechanisms and the second bore of the input member;
        a first, a second, and a third lubrication ports in communication with the first bore of the input member; and
        a first, a second, and a third dam ports in communication with the dam chambers of the third, fourth, and fifth of the five torque-transmitting mechanisms and the third bore of the input member;
    an output member continuously interconnected to at least one of the second member of the fourth planetary gear set and the second member of the third planetary gear set and having a lubrication bore in communication with the first bore of the input member;
    a first interconnecting member continuously interconnecting the first member of the first planetary gear set with the first member of the second planetary gear set;
    a second interconnecting member continuously interconnecting the second member of the first planetary gear set with the third member of the fourth planetary gear set;
    a third interconnecting member continuously interconnecting the third member of the second planetary gear set with the first member of the third planetary gear set; and
    a fourth interconnecting member continuously interconnecting the second member of the third planetary gear set with the second member of the fourth planetary gear set.

2. The multi-speed transmission of claim 1 wherein;
the first of the five torque transmitting mechanisms is selectively engageable to interconnect at least one of the first member of the first planetary gear set and the first member of the second planetary gear set with the stationary element;

the second of the five torque transmitting mechanisms is selectively engageable to interconnect the third member of the first planetary gear set with the stationary element;

the third of the five torque transmitting mechanisms is selectively engageable to interconnect at least one of the second member of the second planetary gear set and the input member with the first member of the fourth planetary gear set;

the fourth of the five torque transmitting mechanisms is selectively engageable to interconnect at least one of the third member of the second planetary gear set and the first member of the third planetary gear set with the first member of the fourth planetary gear set; and the fifth of the five torque transmitting mechanisms is selectively engageable to interconnect the third member of the third planetary gear set with the first member of the fourth planetary gear set; and wherein the five torque-transmitting mechanisms include a first and a second brake and a first, a second, and a third clutch; and the five torque-transmitting mechanisms are selectively engageable in combinations of at least three to establish at least eight forward speed ratios and at least one reverse speed ratio between the input member and the output member.

3. The multi-speed transmission of claim 1 wherein the front support further comprises:
   a third apply fluid passage in communication with a second apply chamber of the first of the five torque transmitting mechanisms;
   a fourth apply fluid passage in communication with a second apply chamber of the second of the five torque transmitting mechanisms;
   a first dam passage in communication with a dam chamber of the first of the five torque transmitting mechanisms; and
   a second dam passage in communication with a dam chamber of the second of the five torque transmitting mechanisms.

4. The multi-speed transmission of claim 1 further comprising:
   a sleeve shaft supported by the front support of the transmission housing;
   a plurality of input member seals; and
   a first annular channel, a second annular channel, a third annular channel, and a fourth annular channel wherein the annular channels are defined by the inner surface of the sleeve shaft, the outer surface of the input member, and the plurality of input member seals, and
   wherein the first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port.

5. The multi-speed transmission of claim 1 further comprising a hydraulic fluid pump fixed to the transmission housing and drivingly connected to at least one of an engine and a torque converter pump, the hydraulic fluid pump providing a pressurized hydraulic fluid to the hydraulic control system.

6. The multi-speed transmission of claim 1 further comprising a first speed sensor assembly, a second speed sensor assembly, and a third speed sensor assembly each having a speed sensor fixed to the transmission housing and a speed sensor ring rotatably fixed to at least one of the interconnecting members, the input member, and the output member.

7. The multi-speed transmission of claim 6 wherein the first speed sensor assembly has a first speed sensor ring rotatably fixed to at least one of the second member of the second planetary gear set and the input member and the third speed sensor assembly has a third speed sensor ring rotatably fixed to the output member.

8. The multi-speed transmission of claim 6 wherein the second speed sensor has a second speed sensor ring rotatably fixed to at least one of the first member of the first planetary gear set, the second interconnecting member, and the third interconnecting member.

9. A multi-speed transmission comprising:
   a transmission housing having a front support, the front support including a first apply fluid passage and a second apply fluid passage;
   a first, a second, a third, and a fourth planetary gear sets each having a first, a second, and a third members;
   five torque-transmitting mechanisms, a first and a second of the five torque-transmitting mechanisms each comprising a first apply chamber and a piston wherein the first apply fluid passage is in communication with the first apply chamber of the first of the five torque-transmitting mechanisms and the second apply fluid passage is in communication with the first apply chamber of the second of the five torque-transmitting mechanisms;
   a third, a fourth, and a fifth of the five torque-transmitting mechanisms each comprising an apply chamber, a dam chamber, and a piston;
   wherein the five torque-transmitting mechanisms selectively interconnect at least one of the first, second, and third members with at least one other of the first members, second members, third members, and the transmission housing;
   an input member continuously interconnected with the second member of the second planetary gear set, the input member having:
      a first, a second, a third, and a fourth bores disposed parallel to a longitudinal axis of the input member;
      a first clutch port in communication with the apply chamber of the third of the five torque-transmitting mechanisms and the first bore of the input member;
      a second clutch port in communication with the apply chamber of the fourth of the five torque-transmitting mechanisms and the fourth bore of the input member;
      a third clutch port in communication with the apply chamber of the fifth of the five torque-transmitting mechanisms and the second bore of the input member;
      a first, a second, and a third lubrication port in communication with the first bore of the input member; and
      a first, a second, and a third dam port in communication with the dam chambers of the third, fourth, and fifth of the five torque-transmitting mechanisms and the third bore of the input member;
   an output member continuously interconnected to at least one of the second member of the fourth planetary gear set and the second member of the third planetary gear set and having a lubrication bore in communication with the first bore of the input member;
   a sleeve shaft fixed to the front support of the transmission housing;
   a plurality of input member seals; and a first annular channel, a second annular channel, a third annular channel, and a fourth annular channel wherein the annular channels are defined by the inner surface of the sleeve shaft, the outer surface of the input member, and the plurality of input member seals.

10. The multi-speed transmission of claim 9 further comprising:
a first interconnecting member continuously interconnecting the first member of the first planetary gear set with the first member of the second planetary gear set;
a second interconnecting member continuously interconnecting the second member of the first planetary gear set with the third member of the fourth planetary gear set;
a third interconnecting member continuously interconnecting the third member of the second planetary gear set with the first member of the third planetary gear set, and
a fourth interconnecting member continuously interconnecting the second member of the third planetary gear set with the second member of the fourth planetary gear set; and
wherein the first of the five torque transmitting mechanisms is selectively engageable to interconnect at least one of the first member of the first planetary gear set and the first member of the second planetary gear set with the stationary element;
the second of the five torque transmitting mechanisms is selectively engageable to interconnect the third member of the first planetary gear set with the stationary element;
the third of the five torque transmitting mechanisms is selectively engageable to interconnect at least one of the second member of the second planetary gear set and the input member with the first member of the fourth planetary gear set;
the fourth of the five torque transmitting mechanisms is selectively engageable to interconnect at least one of the third member of the second planetary gear set and the first member of the third planetary gear set with the first member of the fourth planetary gear set;
the fifth of the five torque transmitting mechanisms is selectively engageable to interconnect the third member of the third planetary gear set with the first member of the fourth planetary gear set, and
the five torque-transmitting mechanisms include a first, a second, and a third clutch and a first and second brake; and
wherein the five torque-transmitting mechanisms are selectively engageable in combinations of at least three to establish at least eight forward speed ratios and at least one reverse speed ratio between the input member and the output member.

11. The multi-speed transmission of claim 9 wherein the front support further comprises:
a third apply fluid passage in communication with a second apply chamber of the first of the five torque transmitting mechanisms;
a fourth apply fluid passage in communication with a second apply chamber of the second of the five torque transmitting mechanisms;
a first dam passage in communication with a dam chamber of the first of the five torque transmitting mechanisms; and
a second dam passage in communication with a dam chamber of the second of the five torque transmitting mechanisms.

12. The multi-speed transmission of claim 11 wherein the first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port.

13. The multi-speed transmission of claim 12 further comprising a hydraulic fluid pump fixed to the transmission housing and drivingly connected to at least one of an engine and a torque converter pump, the hydraulic fluid pump providing a pressurized hydraulic fluid to the hydraulic control system.

14. The multi-speed transmission of claim 13 further comprising a first speed sensor assembly, a second speed sensor assembly, and a third speed sensor assembly each having a speed sensor fixed to the transmission housing and a speed sensor ring rotatably fixed to at least one of the interconnecting members, the input member, and the output member.

15. The multi-speed transmission of claim 14 wherein the first speed sensor assembly has a first speed sensor ring rotatably fixed to at least one of the second member of the second planetary gear set and the input member and the third speed sensor assembly has a third speed sensor ring rotatably fixed to the output member.

16. The multi-speed transmission of claim 14 wherein the second speed sensor has a second speed sensor ring rotatably fixed to at least one of the first member of the first planetary gear set, the second interconnecting member, and the third interconnecting member.

17. A multi-speed transmission comprising:
a transmission housing having a front support, the front support including a first apply fluid passage and a second apply fluid passage;
a first, a second, a third, and a fourth planetary gear sets each having a first, a second, and a third members;
five torque-transmitting mechanisms, a first and a second of the five torque-transmitting mechanisms each comprising a first apply chamber and a piston wherein the first apply fluid passage is in communication with the first apply chamber of the first of the five torque-transmitting mechanisms and the second apply fluid passage is in communication with the first apply chamber of the second of the five torque-transmitting mechanisms;
a third, a fourth, and a fifth of the five torque-transmitting mechanisms each comprising an apply chamber, a dam chamber, and a piston;
an input member continuously interconnected with the second member of the second planetary gear set, the input member having:
a first, a second, a third, and a fourth bores disposed parallel to a longitudinal axis of the input member;
a first clutch port in communication with the apply chamber of the third of the five torque-transmitting mechanisms and the first bore of the input member;
a second clutch port in communication with the apply chamber of the fourth of the five torque-transmitting mechanisms and the fourth bore of the input member;
a third clutch port in communication with the apply chamber of the fifth of the five torque-transmitting mechanisms and the second bore of the input member;
a first, a second, and a third lubrication port in communication with the first bore of the input member; and
a first, a second, and a third dam port in communication with the dam chambers of the third, fourth, and fifth of the five torque-transmitting mechanisms and the third bore of the input member;

an output member continuously interconnected to at least one of the second member of the fourth planetary gear set and the second member of the third planetary gear set and having a lubrication bore in communication with the first bore of the input member;

a first interconnecting member continuously interconnecting the first member of the first planetary gear set with the first member of the second planetary gear set;

a second interconnecting member continuously interconnecting the second member of the first planetary gear set with the third member of the fourth planetary gear set;

a third interconnecting member continuously interconnecting the third member of the second planetary gear set with the first member of the third planetary gear set; and a fourth interconnecting member continuously interconnecting the second member of the third planetary gear set with the second member of the fourth planetary gear set;

a sleeve shaft fixed to the front support of the transmission housing;

a plurality of input member seals;

a first annular channel, a second annular channel, a third annular channel, and a fourth annular channel wherein the annular channels are defined by the inner surface of the sleeve shaft, the outer surface of the input member, and the plurality of input member seals, and wherein the first annular channel communicates with the first bore of the input member through a first port, the second annular channel communicates with the second bore of the input member through a second port, the third annular channel communicates with the third bore of the input member through a third port, and the fourth annular channel communicates with the fourth bore of the input member through a fourth port; and wherein the first of the five torque transmitting mechanisms is selectively engageable to interconnect at least one of the first member of the first planetary gear set and the first member of the second planetary gear set with the stationary element;

the second of the five torque transmitting mechanisms is selectively engageable to interconnect the third member of the first planetary gear set with the stationary element;

the third of the five torque transmitting mechanisms is selectively engageable to interconnect at least one of the second member of the second planetary gear set and the input member with the first member of the fourth planetary gear set;

the fourth of the five torque transmitting mechanisms is selectively engageable to interconnect at least one of the third member of the second planetary gear set and the first member of the third planetary gear set with the first member of the fourth planetary gear set; and the fifth of the five torque transmitting mechanisms is selectively engageable to interconnect the third member of the third planetary gear set with the first member of the fourth planetary gear set.

18. The multi-speed transmission of claim 17 wherein:

the front support further comprises:

a third apply fluid passage in communication with a second apply chamber of the first of the five torque transmitting mechanisms;

a fourth apply fluid passage in communication with a second apply chamber of the second of the five torque transmitting mechanisms;

a first dam passage in communication with a dam chamber of the first of the five torque transmitting mechanisms; and a second dam passage in communication with a dam chamber of the second of the five torque transmitting mechanisms; and the five torque-transmitting mechanisms are selectively engageable in combinations of at least three to establish at least eight forward speed ratios and at least one reverse speed ratio between the input member and the output member.

19. The multi-speed transmission of claim 17 further comprising a hydraulic fluid pump fixed to the transmission housing and drivingly connected to at least one of an engine and a torque converter pump, the hydraulic fluid pump providing a pressurized hydraulic fluid to the hydraulic control system.

20. The multi-speed transmission of claim 17 further comprising:

a first speed sensor assembly, a second speed sensor assembly, and a third speed sensor assembly;

wherein each speed sensor assembly has a speed sensor fixed to the transmission housing and a speed sensor ring rotatably fixed to at least one of the interconnecting members, the input member, and the output member; and wherein the first speed sensor assembly has a first speed sensor ring rotatably fixed to at least one of the second member of the second planetary gear set and the input member, the second speed sensor has a second speed sensor ring rotatably fixed to at least one of the first member of the first planetary gear set, the second interconnecting member, and the third interconnecting member, and the third speed sensor assembly has a third speed sensor ring rotatably fixed to the output member.

* * * * *